United States Patent [19]

Bennett et al.

[11] Patent Number: 4,590,006

[45] Date of Patent: May 20, 1986

[54] ORGANIC PHOTOCONDUCTORS HAVING IMPROVED PRE-EXPOSURE FATIGUE RESISTANCE AND BLOOMING PROPERTIES

[75] Inventors: Everett W. Bennett, Longmeadow; Jan B. Suchy, Holyoke, both of Mass.

[73] Assignee: James River Graphics, Inc., South Hadley, Mass.

[21] Appl. No.: 482,843

[22] Filed: Apr. 7, 1983

Related U.S. Application Data

[63] Continuation-in-part of Ser. No. 320,068, Nov. 10, 1981, abandoned.

[30] Foreign Application Priority Data

Nov. 9, 1982 [CA] Canada .................................. 415158

Nov. 10, 1982 [WO] PCT Int 1 Appl. . PCT/US82/01596

[51] Int. Cl.$^4$ .............................................. C09B 11/10

[52] U.S. Cl. ..................................................... 260/393

[58] Field of Search ......................................... 260/393

[56] References Cited

U.S. PATENT DOCUMENTS

| | | | |
|---|---|---|---|
| 2,209,902 | 7/1940 | Ralston et al. | 260/393 X |
| 3,647,349 | 3/1972 | Raue et al. | 260/393 X |
| 4,045,458 | 8/1977 | Kondo et al. | 260/393 |
| 4,211,436 | 7/1980 | Kühlthan et al. | 260/393 X |
| 4,247,470 | 1/1981 | Hermann et al. | 260/393 X |

*Primary Examiner*—Paul F. Shaver

*Attorney, Agent, or Firm*—Burns, Doane, Swecker & Mathis

[57] ABSTRACT

New compounds of the formula

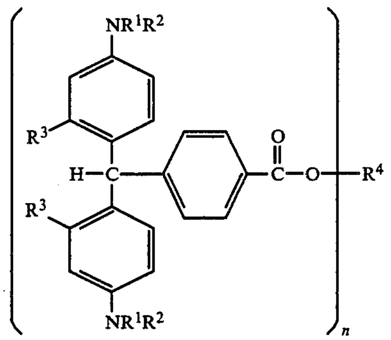

(I)

wherein n is 1 or 2; $R^1$ and $R^2$ are alkyl or aralkyl; $R^3$ is alkyl; when n is 1, $R^4$ is alkyl, aralkyl, alkenyl, aralkenyl, aryl or a polyether radical having up to 10 ether groups; and when n is 2, $R^4$ is alkylene, aralkylene, alkenylene, aralkenylene, arylene or a divalent polyether radical having up to 10 ether groups. The compounds are highly efficacious organic photoconductors for use in electrophotography, exhibiting improved pre-exposure fatigue resistance and blooming properties as compared with known photoconductors. Photoconductive elements containing these compounds are also described.

13 Claims, No Drawings

ORGANIC PHOTOCONDUCTORS HAVING IMPROVED PRE-EXPOSURE FATIGUE RESISTANCE AND BLOOMING PROPERTIES

CROSS-REFERENCE TO RELATED APPLICATION

This application is a continuation-in-part of our earlier copending application, Ser. No. 320,068, filed Nov. 10, 1981, now abandoned, expressly incorporated by reference herein in its entirety and relied upon.

FIELD OF THE INVENTION

The present invention relates to novel substituted triarylmethane compounds, and to their use as organic photoconductors in photoconductive elements, such as for example are utilized in electrophotographic processes such as xerography. More particularly, the present invention relates to triarylmethane compounds containing para-substituted amino and ortho-alkyl groups on two of the aryl rings, and a para-carboxy ester substituent on the third aryl ring, and to diesters of these compounds comprising two triarylmethane residues covalently attached through para-carboxy groups and a divalent linking radical, and further, to the use of these compounds as organic photoconductors in electrophotographic elements.

BACKGROUND ART

Triarylmethane compounds are well known to those skilled in the art, finding use in a variety of applications, such as for example, as textile dyestuffs and as fungicides. U.S. Pat. No. 501,104, for example, discloses 4,4'-bis(dimethylamino)-4"-carboxytriphenylmethane; U.S. Pat. No. 4,041,054 discloses 4-halogeno-4',4"-diarylaminotriphenylmethanes; U.S. Pat. No. 3,647,349 discloses carbonium ion salts based on 4-substituted amino-4'-alkoxytriphenylmethanes containing at the 4" position a group such as an alkyl, aralkyl, aryl, alkoxy, aralkoxy, aryloxy, alkylmercapto, arylmercapto, halogen, carboxylic acid ester radical, carbonamido, sulfonamido, cyano, nitro, alkylsulfonyl, or other groups; and U.S. Pat. No. 3,794,642 discloses triphenylmethanes wherein each of the phenyl rings may be substituted with a halogen, $C_1$–$C_4$ alkyl, nitro, amino, cyano, acetyl, methoxy, or trifluoromethyl group.

Recently, various triarylmethanes have been suggested for use as organic photoconductors in photoconductive elements. For example, U.S. Pat. No. 4,047,949 discloses that 4,4'-bis(diethylamino)-2,2'-dimethyltriphenylmethane is suitable for use as a photoconductor for electrophotoconductive elements. Other triarylmethanes which have been suggested for use as photoconductors include 4',4"-diamino-4-dimethylamino-2',2"-dimethyltriphenylmethane, 4',4"-bis(diethylamino)-2,6-dichloro-2',2"-dimethyltriphenylmethane, 2',2"-dimethyl-4,4',4"-tris(dimethylamino)triphenylmethane, 4',4"-bis(diethylamino)-4-dimethylamino-2',2"-dimethyltriphenylmethane, 4',4"-bis(diethylamino)-2-chloro-2',2"-dimethyl-4-dimethylaminotriphenylmethane, 4',4"-bis(diethylamino)-4-dimethylamino-2,2',2"-trimethyltriphenylmethane, 4',4"-bis(dimethylamino)-2-chloro-2',2"-dimethyltriphenylmethane, 4',4"-bis(dimethylamino)-2',2"-dimethyl-4-methoxytriphenylmethane, 4',4"-bis(benzylethylamino)-2',2"-dimethyltriphenylmethane and 4',4"-bis(diethylamino)-2,2"-diethoxytriphenylmethane (U.S. Pat. Nos. 3,703,371 and 3,703,372); the hydroxy, halo, nitro, cyano, sulfo, alkoxy, carboxy, alkyl, acyl, acylamido or acyloxy substituted 4,4'-bis(dialkylamino)triphenylmethanes of U.S. Pat. No. 3,739,000; and the 4',4"-bis(disubstituted amino)-2',2"-disubstituted triphenylmethanes of U.S. Pat. No. 3,542,547. This latter group of compounds may be optionally substituted at the 4 position with a dialkylamino, alkylamino, amino, alkyl, alkoxy, hydroxyl or halogen group, or at the 5' and 5" positions with an alkyl, alkoxy, hydroxyl or halogen group.

Other classes of compounds in addition to the triarylmethanes which have heretofore been suggested for use as photoconductors in electrophotographic elements are described in U.S. Pat. Nos. 3,703,371; 3,703,372; and 4,140,529.

In order for a given compound to be suitable for use as an organic photoconductor in photoconductive elements, photoconductive elements containing the compound should exibit desirable photographic speeds, and for many applications be stable to ambient light, such as the 50–100 foot-candle lighting normally encountered, for example, in a business office, non-safe processing facility or the like. In addition, the photoconductor compound should exhibit a low tendency to bloom, i.e., a low tendency to migrate to the surface of the photoconductive element. Both pre-exposure fatigue (the limit of tolerance of a photoconductor compound for ambient light) and blooming have adverse effects on the photographic sensitivity, reducing a photoconductive element's imaging ability and speed.

As is well known to those skilled in the art, photoconductive elements, such as electrophotographic film, typically comprise a support having coated thereon a photoconductive composition comprising an insulating binder or matrix resin, an organic photoconductor and a sensitizing dye. The pre-exposure light fatigue of an electrophotographic film based on organic photoconductors has been found to depend on all three main components of the photoconductive layer, but the photoconductor appears to exert the dominant influence on the stability of the sensitizing dye. It has also been found that the loss of photospeed of a photoconductive element containing a given sensitizer upon pre-exposure illumination is closely related to the type of photoconductor employed, such as for example, phenylenediamine, oxydianiline or triarylmethane. It is thus desirable to employ as the organic photoconductor compounds which have a high tolerance for ambient light. This tolerance for ambient light is especially valuable in demanding electrophotographic applications requiring controlled sensitometry wherein repeated variable exposure to ambient lighting occurs, such as is involved in the use of the film as a microfilm file record with an add-on updating capability. Accordingly, as used herein, the term "pre-exposure fatigue resistance" refers to the tolerance of a photoconductor compound for ambient light, such as the 50–100 foot-candle lighting normally encountered in most indoor environments. Under the foregoing conditions, conventional electrophotographic films based on organic photoconductors such as, for example, the phenylenediamines can be expected to suffer enough sensitivity loss due to pre-exposure fatigue in just two hours to noticeably affect image quality.

In addition to pre-exposure fatigue resistance, photoconductors suitable for use in electrophotographic elements must exhibit a low tendency to bloom or migrate to the surface of the photoconductive layer. Compounds having a pronounced tendency to bloom will, particularly upon storage, rise to the surface of the polymer matrix of the photoconductive layer and form liquid or crystalline deposits. Such blooming has a deleterious effect on image quality.

In contrast to the compounds of the present invention, the triarylmethanes which have heretofore been suggested for use as photoconductors for electrophotographic elements do not possess that combination of pre-exposure fatigue resistance and blooming properties desirable for commercial use as photoconductors in many electrophotographic systems. While the triarylmethanes of the prior art have performed satisfactorily in certain electrophotographic elements wherein these compounds are utilized in conjunction with certain specific sensitizers and binder resins, with other common sensitizer and binder resin combinations the triarylmethanes of the prior art have exhibited less than desirable pre-exposure fatigue resistance and blooming properties. As the triarylmethanes exhibit a desirable photoconductive efficiency, it would thus be desirable to provide a new class of triarylmethane compounds which possess the pre-exposure fatigue resistance and blooming properties desirable for successful use as photoconductors in a wide variety of electrophotographic elements.

SUMMARY OF THE INVENTION

Accordingly, it is an object of the present invention to provide a new class of triarylmethanes which are suitable for use as organic photoconductors for use in photoconductive elements.

It is a specific object of the instant invention to provide a new class of triarylmethane photoconductors which exhibit both improved pre-exposure fatigue resistance and blooming properties.

It is an additional object of the present invention to provide photoconductive elements containing triarylmethane photoconductors which exhibit both improved pre-exposure fatigue resistance and blooming properties.

In accomplishing the foregoing and other objects, there has been provided in accordance with the present invention, a novel class of triarylmethanes which are highly suitable for use as photoconductors in photoconductive elements, comprising compounds having the structural formula (I):

(I)

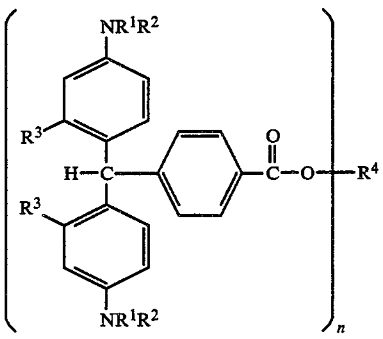

wherein n is the integer 1 or 2; $R^1$ and $R^2$ are each an alkyl or aralkyl radical; $R^3$ is an alkyl radical; when n is 1, $R^4$ is an alkyl, aralkyl, alkenyl or aralkenyl radical, or an aryl radical having 6 carbon atoms in the aromatic nucleus, or a polyether radical containing up to 10 ether groups; and when n is 2, $R^4$ is a divalent linking radical selected from the group consisting of alkylene, aralkylene, alkenylene and aralkenylene radicals, arylene radicals having 6 carbon atoms in the aromatic nucleus and divalent polyether radicals containing up to 10 ether units.

Films containing the compounds of structural formula (I) possess improved pre-exposure fatigue resistance, exhibiting a pre-exposure fatigue resistance as much as 100 times greater than that of similar films containing photoconductor compounds such as the phenylenediamines. In addition, the carboxy ester substituted compounds of formula (I) possess improved compatibility with matrix resins, such as the polyester type matrix resins, as evidenced by their reduced propensity to bloom at the higher photoconductive loadings preferred where maximum film speed is desired. This is believed to be attributable to the presence of the compatibilizing $-COOR^4$ group, which is similar to the ester structure of the polyester type resin matrices, and to the fact that the photoconductor molecules can, in effect, be ballasted by using esters derived from long chain alcohols or polyols to reduce their ability to migrate.

In other embodiments, the present invention also provides photoconductive elements suitable for use in electrophotography which comprise a support having coated thereon a photoconductive composition comprising a film-forming insulating resin binder having dispersed therein as a photoconductor a compound of formula (I). In a particularly preferred embodiment of these photoconductive elements, the photoconductive composition comprises a compound of formula (I), a solid film-forming resin binder and a sensitizer.

Other objects, features and advantages of the present invention will become apparent to the skilled artisan upon examination of the following detailed description of the present invention.

DETAILED DESCRIPTION OF THE INVENTION

The essence of the instant invention comprises the discovery that the compounds of formula (I) possess a combination of properties which render them highly advantageous for use, among other possible utilities, as organic photoconductors for electrophotographic elements. In particular, the compounds of formula (I) exhibit a high photoconductive efficiency in combination with an improved pre-exposure fatigue resistance. In addition, the compounds of formula (I) possess a lower propensity to bloom when dispersed in a matrix or binder resin. In contrast to the triarylmethanes of the prior art, it is believed that the carboxy ester group $-COOR^4$, which may be derived from long chain alcohols or polyols, ballasts the compounds of the present invention in the matrix polymer, reducing their ability to migrate.

As can be seen from formula (I), the present invention provides two types of triarylmethanes, both of which are highly desirable for use as photoconductors in electrophotographic elements, i.e. hindered triarylmethanes of formula (II):

(II)

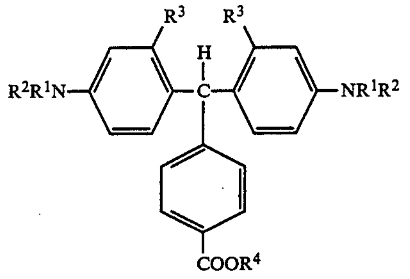

wherein $R^1$, $R^2$, $R^3$ and $R^4$ are as defined above, and hindered triarylmethane diesters of formula (III):

(III)

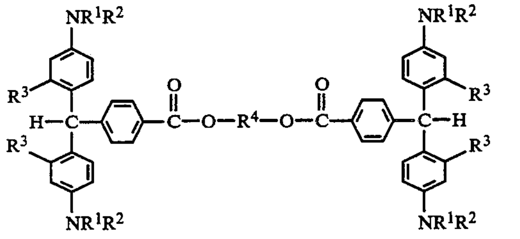

wherein $R^1$, $R^2$, $R^3$ and $R^4$ are also as defined above.

In addition to their various other possible utilities, such as would be apparent to those skilled in the art, in a particularly preferred embodiment, the triarylmethanes of formulae (I)-(III) are utilized as organic photoconductors in electrophotographic elements. Particularly preferred compounds for this purpose comprise those compounds of the above formulae wherein $R^1$ and $R^2$ comprise a straight or branched chain alkyl group containing up to 5 carbon atoms such as, for example, methyl, ethyl, propyl, isopropyl, butyl, sec-butyl or pentyl, or an aralkyl group containing up to 14 carbon atoms, such as, for example, benzyl, beta-phenethyl, alpha-phenethyl, alpha-phenylpropyl, beta-phenylpropyl, or lower alkyl-substituted benzyl such as, for example, methylbenzyl, ethylbenzyl, isopropylbenzyl, propylbenzyl and the like; $R^3$ is a straight or branched chain alkyl group containing up to 5 carbon atoms such as has been illustrated above with respect to $R^1$ and $R^2$; and $R^4$ is a straight or branched chain alkyl group containing up to 18 carbon atoms, such as, for example, methyl, ethyl, propyl, isopropyl, butyl, sec-butyl, tert-butyl, pentyl, hexyl, heptyl, octyl, nonyl, decyl, undecyl, dodecyl, tetradecyl, hexadecyl, octadecyl and the like; an aralkyl group containing up to 14 carbon atoms such as has been described above with respect to $R^1$ and $R^2$; a straight or branched chain alkenyl group containing up to 10 carbon atoms, such as, for example, ethenyl, propenyl, butenyl and the like; an aralkenyl group containing up to 14 carbon atoms, such as, for example, styryl, cinnamyl and the like; an aryl group having 6 carbon atoms in the aromatic nucleus, such as, for example, phenyl, substituted phenyl, especially lower alkyl-substituted phenyl such as methyl-, ethyl-, propyl- or isopropyl-substituted phenyl; a polyether radical containing up to 10 ether groups, such as, for example, a polyethylene or polypropylene or polybutylene glycol or polyphenylene ether radical having up to 10 ether units; an alkylene group containing up to 10 carbon atoms, such as, for example, ethylene, trimethylene, propylene, tetramethylene, pentamethylene, hexamethylene, neopentylene and the like; an aralkylene group containing up to 14 carbon atoms, such as, for example, phenylethylene, wherein the phenyl portion is optionally lower alkyl-substituted, and the like; an alkenylene group containing up to 10 carbon atoms, such as, for example, vinylene, propenylene, butenylene and the like; an aralkenylene group containing up to 14 carbon atoms; an arylene group having six carbon atoms in the aromatic nucleus such as, for example, phenylene, alkyl-substituted phenylene, including methyl-, ethyl-, propyl-, and isopropyl-substituted phenylene, and phenylene substituted with a group such as, for example, hydroxy, halo, nitro, cyano, sulfo, alkoxy, carboxy, acyl, acylamido, acyloxy or other groups; an aralkyl group substituted with any of the groups enumerated above or other substituted aralkyl groups; or a divalent polyether group containing up to 10 ether units, such as for example, a divalent polyethylene glycol, polypropylene glycol, polybutylene glycol or polyphenylene ether group containing up to 10 ether units.

Because the photoconductivity depends on the molar concentration of the compound in the matrix, which in turn is limited by the solubility of the photoconductor in the matrix, for most purposes it is preferable to achieve as high a molarity as possible for a given percent by weight solubility in the matrix resin by using relatively lower molecular weight substituents. Thus, while substituents larger than those described above may be employed where desired (for example, $R^1$ and/or $R^2$ may be larger than pentyl where convenient), in order to achieve a high molarity in the matrix resin those substituents set forth above are preferred for the purposes of the present invention. For similar reasons, within each of the groups of substituents set forth above, the lower molecular weight substituents are usually more preferred.

Especially preferred compounds within the foregoing formulae include those compounds wherein $R^1$ and $R^2$ are methyl, ethyl, propyl or isopropyl; $R^3$ is methyl or ethyl; and $R^4$ is an alkyl group containing up to 18 carbon atoms, an alkenyl group containing up to 10 carbon atoms, an alkylene group containing up to 10 carbon atoms, phenyl, substituted phenyl, benzyl, alkyl-substituted benzyl, alpha-phenethyl, beta-phenylethyl, alpha-phenylpropyl, beta-phenylpropyl, phenylene, substituted phenylene, or polyethylene glycol, polypropylene glycol, and polybutylene glycol groups containing up to 10 glycol units.

The most preferred compounds within the foregoing formulae comprise the compounds of formula (II) wherein $R^1$ and $R^2$ are methyl, ethyl, propyl or isopropyl; $R^3$ is methyl or ethyl; and $R^4$ is methyl, ethyl, isopropyl or butyl. These compounds have been found to exhibit outstanding fatigue resistance and a reduced propensity to bloom, particularly in the polyester type resin binders, due to the compatibilizing and ballasting effect of the carboxy ester group, while at the same time possessing the further advantage of having a molecular weight sufficiently low to allow the attainment of desirable loading molarities in the matrix resin. Such compounds are accordingly highly suited for use as photoconductors in photoconductive elements.

The compounds of the present invention may be prepared by any method well known to those skilled in the art. Examples of such processes are described in U.S. Pat. Nos. 501,104 and 3,739,000; and in "Chemistry of Carbon Compounds", E. H. Rodd, ed., Elsevier Publishing Company, Vol. III, 1956, pp. 1078-1081, the entirety of which are expressly incorporated by reference herein. A preferred method for the preparation of the carboxy ester substituted compounds of formula (II) comprises the sulfuric acid catalyzed condensation of a N,N-dialkyltoluidine or analogous compound with methyl p-formyl benzoate using any of the solvents well known to those skilled in the art as being suitable for this type of reaction. If technical grade (60%) methyl p-formyl benzoate is used, however, the solvent may be dispensed with. Moreover, if the mixture of N,N-dialkyltoluidine, technical grade methyl p-formyl benzoate and concentrated sulfuric acid is heated (typically at 110° to 120° C.) for relatively long periods of time (typically 7 hours), the condensation product is obtained in the form of a water soluble salt, which produces after neutralization and recrystallization a pure product in high yield (typically about 80%).

Other carboxy ester substituted compounds within the scope of formula (II) may then easily be prepared by transesterification of the 4,4'-bis(disubstituted amino)-2,2'-dialkyl-4"-carbomethoxytriphenylmethane with a suitable alcohol, glycol, or other compound containing a free esterifiable hydroxy group in the presence of a suitable transesterification catalyst.

The diesters of formula (III) may be prepared by condensing a N,N-dialkyltoluidine or similar compound with methyl p-formyl benzoate in the manner described above. The resulting 4,4'-bis(disubstituted amino)-2,2'-dialkyl-4"-carbomethoxytriphenylmethane product is then transesterified in a conventional manner with a suitable glycol, e.g., polyethylene glycol, 1,4-butanediol, etc., to produce the diester.

As has been discussed above, a preferred use of the triarylmethanes of the present invention is as organic photoconductors in photoconductive elements comprising a support having coated thereon a photoconductive composition comprising a film-forming insulating resin binder having dispersed therein an effective amount of one or more compounds of formula (I). Generally, the triarylmethane photoconductors will comprise from about 10–60% by weight, preferably 10–30% by weight, and most preferably 15–25% by weight of the photoconductive layer.

The photoconductive elements of the invention can also be sensitized by the addition of effective amounts of sensitizing compounds to exhibit improved electrophotosensitivity. Sensitizing compounds useful with the photoconductive compounds of the present invention can be selected from a wide variety of materials, including such materials as pyrylium salts including the thiapyrylium and selenapyrylium dye salts disclosed in Van Allan et al U.S. Pat. No. 3,250,615; fluorenes, such as 7,12-dioxo-13-dibenzo(a,h)fluorene, 5,10-dioxo-4a,11-diazabenzo(b)fluorene, 3,13-dioxo-7-oxadibenzo(b,g)-fluorene, and the like; aromatic nitro compounds of the type described in U.S. Pat. No. 2,610,120; anthrones such as those disclosed in U.S. Pat. No. 2,670,284; the quinones of U.S. Pat. No. 2,670,286; the benzophenones of U.S. Pat. No. 2,670,287; the thiazoles of U.S. Pat. No. 2,732,301; dichloroacetic acid; and various dyes, such as cyanine (including carbocyanine), merocyanine, diarylmethane, triarylmethane, thiazine, azine, oxazine, xanthene, phthalein, acridine, azo, anthraquinone dyes and the like, and mixtures thereof. Other sensitizers suitable for use in the photoconductive elements of the instant invention include the UV and charge transfer sensitizers such as, for example, Micheler's Ketone, tetranitrofluoronone and 9,10-phenanthrenequinone. The sensitizers preferred for use with the compounds of this invention comprise the sensitizer dyes, such as for example, the triarylmethane, oxazine and cyanine dyes; the pyrilium and thiapyrilium salts; and the charge transfer sensitizers.

Although a sensitizer is not necessary to impart photoconductivity to the photoconductive element, and accordingly the use thereof is not mandatory, an effective amount of the sensitizer is frequently mixed with the photoconductor and binder, since the use of relatively small amounts of sensitizing compound give substantial improvement in the speed of the film. The amount of sensitizer that can be added to a photoconductive composition to provide effective increases in speed can vary widely. The optimum concentration in any given system will vary with the specific photoconductor and sensitizing compound used. In general, if a sensitizer is utilized, it will be employed in an amount of up to about 5% by weight, preferably from about 0.01 to 1% by weight, and most preferably in an amount of less than 0.1% by weight of the photoconductive layer.

The resin binder employed in the photoconductive elements of the present invention may comprise any film-forming, non-tacky insulating resin well known to those skilled in the art. In general, the resin binder will comprise an insulating resin having a high dielectric strength, i.e. a dielectric strength such that a 12 micron thick sample of the resin will hold a 1000–2000 volt charge. By way of illustration, suitable resin binders include any of the polyester resins, vinyl chloride resins, polyacrylate resins, polybenzal resins, or polycarbonate resins which are well known to those skilled in the art to be suitable for this purpose, with the polyester resins being preferred. A particularly preferred resin binder comprises a novel linear film-forming polyester resin having its terminal hydroxy and carboxyl groups endblocked with an aprotic group; such endblocked polyester resins are described in applicants' copending application Ser. No. 320,064, filed concurrently with applicants' parent application Ser. No. 320,068, the entirety of Ser. No. 320,064 also being expressly incorporated by reference herein. The aprotic groups of the endblocked resins reduce hydrogen bonding within the resin matrix, and enhance the flowability of the resin when heated. Such endblocked polyester resins improve the fusibility and photographic speed of electrophotographic elements in which they are used. The aprotic endblocking group preferably comprises a urethane, ether, ester or amide group, or combination thereof. The polyester resin preferably has an average molecular weight of at least 10,000, more preferably from about 12,000 to 35,000. In a particularly preferred embodiment, the aprotic group comprises a group of the formula $R^3NHCO$— or $R^3NHCOO$— wherein $R^3$ is $C_1$-$C_4$ alkyl, unsubstituted phenyl or phenyl substituted with a halogen, nitro, cyano, ester, tertiary amide group or combinations thereof, most especially when $R^3$ is n-butyl, phenyl, p-chlorophenyl, 2,5-dichlorophenyl, p-cyanophenyl or p-nitrophenyl. These endblocked polyester resins can be prepared by any method and well known to those skilled in the art which does not degrade the polyester resin's degree of polymerization or otherwise adversely affect the polymer. Polyester resins endblocked with urethane and/or amide groups are highly preferred because they can be readily prepared via a simple one-step procedure without the danger of chain scission by reacting, for example, a polyester resin with a suitable isocyanate compound. Diisocyanate compounds can also be used, provided any residual isocyanate endblock groups are stabilized by conversion to a urethane or amide group. This may be readily done by treatment of the isocyanate endblocked resin with an alcohol, e.g. methanol, ethanol, isopropanol, isobutanol, tert-butanol or other lower alkanol, or with a carboxylic acid.

In the preferred embodiment of the present invention, the photoconductive elements of the present invention preferably comprise a conductive support having coated thereon a photoconductive insulating layer comprising from about 10 to about 60% by weight of one of the triarylmethane photoconductor compounds of the present invention, together with up to 5% by weight of a dye sensitizer dispersed in a polycarbonate, acrylic, vinyl, acrylic/vinyl polyblend, linear film-forming polyester, or other well known resin binder. Such photoconductive elements exhibit a particularly attractive combination of speed, pre-exposure fatigue resistance, and blooming stability.

In preparing the photoconductive elements of the present invention, a photoconductive coating composition is prepared by dissolving the photoconductors of the instant invention with the resin binder, optionally together with a sensitizer, in a suitable organic solvent, such as for example, benzene, toluene, chlorinated hydrocarbons such as methylene chloride, ethylene chloride, and the like; ethers, such as tetrahydrofuran and the like; ketones, such as for example, methyl ethyl ketone; or mixtures thereof. The resulting photoconductive coating composition is thereafter coated onto a suitable support, the coating thickness of which can vary widely. Normally, a wet coating thickness in the range of about 0.0005 inch to about 0.01 inch is employed. A preferred range of coating thicknesses is from about 0.001 inch to about 0.006 inch before drying, although such thicknesses can vary widely depending upon the particular application desired for the electrophotographic element.

Suitable supporting materials may comprise any of the conductive supports well known to those skilled in the art. Examples of suitable materials include, for example, paper (at a relative humidity above 20%); aluminum-paper laminates; metal foils, such as aluminum foil, zinc foil and the like; metal plates such as aluminum, copper, nickel, zinc, brass, and galvanized plates; vapor deposited conductive layers such as silver, nickel, aluminum, or conductive metal oxide, sulfide or iodide layers on conventional film supports such as cellulose acetate, poly(ethylene terephthalate), polycarbonate, polysulfone, polystyrene and the like; or any of the preceding polymer supports containing an ionically conductive layer of, for example, polymers of quaternary ammonium salts. Preferred polymer films for use in the supports include the polyester films, such as, for example, poly(ethylene terephthalate), the polycarbonate films, polysulfone films, polystyrene films, with the poly(ethylene terephthalate) films being most preferred. For many utilities, it is also frequently desirable to employ a transparent support, such as for example a transparent polyester film support.

A particularly useful photoconductive element in accordance with the present invention comprises a transparent polyester film support having a conductive ground layer comprising a metallized transparent vacuum deposited film of aluminum, nickel or a semi-conductor such as indium oxide, tin oxide or cadmium oxide, or an ionically conductive film of various quaternary ammonium salt polymers, coated with a photoconductive insulating layer comprising from about 10 to 60% by weight of one of the triarylmethane photoconductor compounds of the present invention, together with up to 5% by weight of a triarylmethane, oxazine, cyanine, pyrilium salt, thiapyrilium salt, or charge transfer sensitizer, dispersed in a high dielectric strength polyester, polycarbonate, acrylic, vinyl or vinyl/acrylic polyblend resin binder.

The photoconductive elements of the present invention can be employed in any of the electrophotographic processes well known to those skilled in the art which require photoconductive layers. One such process is the xerographic process. In a process of this type, an electrophotographic element held in the dark is given a blanket electrostatic charge by placing it under a corona discharge to give a uniform charge to the surface of the photoconductive layer. This charge is retained by the layer owing to the substantial dark insulating property of the layer, i.e. the low conductivity of the layer in the dark. The electrostatic charge formed on the surface of the photoconductive layer is then selectively dissipated from the surface of the layer by imagewise exposure to light by means of a conventional exposure operation such as, for example, by a contact-printing technique or by lens projection of an image, or reflex or bireflex techniques and the like, to thereby form a latent electrostatic image in the photoconductive layer. Exposing the surface in this manner forms a pattern of electrostatic charge by virtue of the fact that light energy striking the photoconductive element causes the electrostatic charge in the light struck areas to be conducted away from the surface in proportion to the intensity of the illumination in a particular area.

The charge pattern produced by exposure is then developed or transferred to another surface and developed there, i.e. either the charged or uncharged areas rendered visible, by treatment with a medium comprising electrostatically responsive particles having optical density. The developing electrostatically responsive particles (often referred to as the toner) can be in the form of a dust, or a powder and generally comprise a pigment in a resinous carrier. A preferred method of applying such a toner to a latent electrostatic image for solid area development is by the use of a magnetic brush. Methods of forming and using a magnetic brush toner applicator are described in the following U.S. Pat. Nos.: 2,786,439; 2,786,440; 2,786,441; 2,811,465; 2,874,063; 2,984,163; 3,040,704; 3,117,884; and reissue No. Re. 25,779. Liquid development of the latent electrostatic image may also be used. In liquid development the developing particles are carried to the image-bearing surface in an electrically insulating liquid medium. Methods of development of this type are widely known and are described, for example, in U.S. Pat. No. 2,297,691 and in Australian Pat. No. 212,315. In dry developing processes the most widely used method of obtaining a permanent record is achieved by selecting a developing particle which has as one of its components a low-melting resin. Heating the powder image then causes the resin to melt or fuse into or on the element. The powder is, therefore, caused to adhere permanently to the surface of the photoconductive element. In other cases, a transfer of the charge image or powder image formed on the photoconductive element can be made to a second support such as paper which would then become the final print after developing and fusing or fusing respectively. Techniques of the type indicated are well known in the art and are described, for example, in U.S. Pat. Nos. 2,297,691 and 2,551,582.

The photoconductive elements of the present invention can be used in electrophotographic materials having many structural variations. For example, in addition to the photoconductive elements described above, multiple layers of the photoconductive composition may be coated on a suitable support. Likewise, multiple layered structures may be built up by interposing layers of insulating material or other photoconductive material between the photoconductive layers containing the photoconductors of the present invention.

In order to more fully describe the present invention, the following examples are presented which are intended merely to be illustrative and not limitative.

EXAMPLE I

This example illustrates the preparation of various representative compounds in accordance with the present invention.

A. Preparation of 4,4'-bis(diethylamino)-2,2'-dimethyl-4''-carbomethoxytriphenylmethane 180 Grams of N,N-diethyl-m-toluidine (1.10 moles), having the structural formula

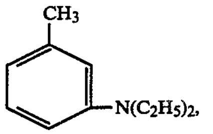

220 grams of technical grade methyl p-formyl benzoate, having the structural formula

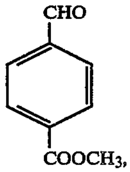

and 80 grams of 98% sulfuric acid were mixed in a suitable heated reaction vessel equipped with a stirrer. The temperature of the mixture rose rapidly to 82° C., forming a homogeneous, thin, light yellow oil. Without further mixing, the temperature was then increased to 115° C. and maintained at this temperature for 7 hours until the light yellow oil gradually thickened and assumed an olive green color. At the end of 7 hours, the hot reaction mixture was diluted with 500 ml of 85° C. hot water, and thereafter 10 ml of concentrated hydrochloric acid were added, producing a total volume of 900 ml.

Upon cooling by standing overnight, crystals were observed in the reaction vessel. These crystals were separated from the reaction solution by filtration. The filtered reaction solution was then extracted three times with 50 ml of toluene, with the toluene phase being discarded upon separation. The thus produced mother liquor was then heated to 60° C. and neutralized to pH 7, under vigorous stirring, with 70 grams of sodium hydroxide in 200 ml of water. On standing, the mixture separated into an oily upper layer and a lower water layer. The water layer was removed, following which the oily upper layer was mixed with 300 ml of 60° C. hot water. On standing, the mixture separated into an aqueous upper layer and an oily lower layer. After heating to 80° C. for about 30 minutes, the oily lower layer solidified into a light olive colored product.

Thereafter, the water layer was removed and the resulting solid substance was broken into smaller pieces and dried at 120° C. in vacuo, resulting in a crude greenish product, which was then recrystallized from a toluene, ethanol solution. The resultant light beige powder had a melting point of 144°-145° C., and was produced in a yield of approximately 80% based on the toluidine. The product has the structural formula

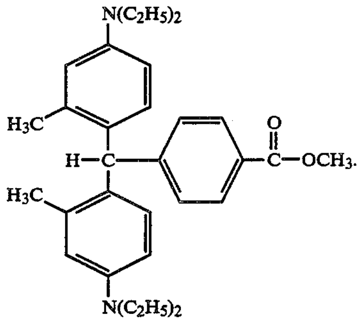

B. Preparation of a 4,4-bis(diethylamino)-2,2'-dimethyl-4''-carboxytriphenylmethane and 1,4-butanediol diester A 100 ml round bottom flask equipped with a thermometer well was charged with 33.32 grams (0.070 mole) of 4,4'-bis(diethylamino)-2,2'-dimethyl-4''-carbomethoxytriphenylmethane, 3.60 grams of 1,4-butanediol, four drops of tetraisopropyltitanate transesterification catalyst, and 0.1 gram of sodium methoxide. The head space was purged with nitrogen, and the flask connected via a Dry Ice trap to a vacuum pump. A silicone oil bath was used to slowly melt the mix and bring it to 205° C. before applying vacuum. Over two hours, the pot was raised to 240° C. and the pressure reduced to 0.5 mm Hg in order to bring the transesterification reaction to completion.

After cooling, a glassy product was obtained, which was dissolved in 200 ml of toluene, and then stripped of solvent in a rotary evaporator. The resulting material was then recrystallized by boiling with 150 ml of a 1:1 by volume mixture of toluene and ethanol, followed immediately by hot filtration. This procedure produced 16.3 grams of diester having a melting point of 194°-195° C. Thin layer chromatography of the product, developed with a 6:1 mixture of hexane and ether and detected with iodine vapor, showed only one product present. The product has the structural formula

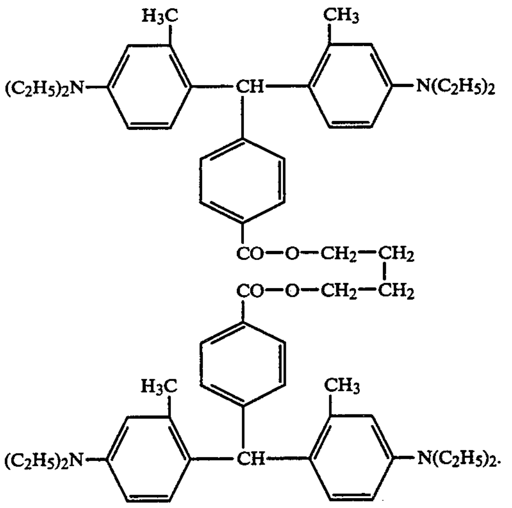

C. Preparation of 4,4'-bis(diethylamino)-2,2'-dimethyl-4''-carbodecyloxy-triphenylmethane A 500 ml round bottom flask equipped with a thermometer well was charged with 33.3 grams (0.070 mole ) of 4,4'-bis(diethylamino)-2,2'-dimethyl-4''-carbomethoxytriphenylmethane, 12.7 grams (0.08 mole ) of n-decanol, 0.5 gram of sodium methoxide and 1 ml of tetraisopropyltitanate transesterification catalyst. The flask was purged with nitrogen and then heated under a 6'' Vigreaux column with a side-arm water jacket condensor and a collection flask. At about 140° C. pot temperature, methanol began to distill off. The flask was then slowly heated to 180° C. and held there for two hours. At the end of this period, the melt temperature was increased to 200° C. for thirty minutes, following which the reaction mixture was allowed to cool.

The resulting product was dissolved in toluene and filtered. The recovered filtrate was thereafter desolvated in a rotary flash evaporator, producing a crude decyl ester product. The crude decyl ester product was then freed of any residual decanol by repeated dissolving in diluted hydrochloric acid and precipitation with sodium carbonate. After drying at 100° C. in vacuo, 29 grams of a thick oily pure decyl ester product were obtained. The product has the structural formula

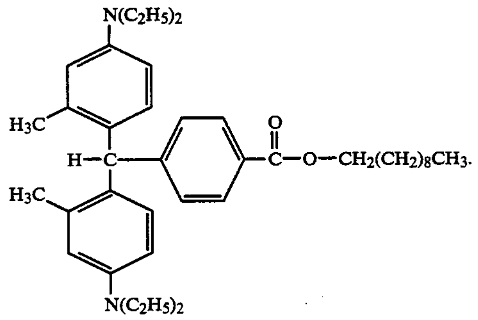

EXAMPLE II

In order to illustrate the enhanced pre-exposure fatigue resistance of the compounds of the present invention, a series of electrophotographic films was prepared. Each of these films contained 0.03% by weight of ethyl violet as the sensitizer dye, and 25% by weight of an organic photoconductor. Binder resins utilized in the preparation of each of the sample films included a vinyl-acrylic polyblend comprising 2 parts of polymethyl methacrylate containing a minor amount of a different methacrylate monomer to 1 part by weight of a vinyl chloride resin containing minor amounts of vinyl acetate and vinyl alcohol comonomers, and an endblocked polyester binder resin prepared as described below. The support in each of these films comprised DuPont Mylar polyester (5 mils thick) coated with a vacuum deposited aluminum layer, approximately 55-65% light transmitting.

Preparation of Endblocked Polyester Resin

An electrophotographic polyester resin was obtained commercially from the Bostik Division of the USM Corp. under the designation USM 7942. This type of polyester comprises a linear, film-forming polyester having a molecular weight ranging between 14,000 and 28,000, a hydroxyl end group concentration described by an OH number of from 1-2, and a carboxyl endgroup concentration of about 3 to 6. The urethane/amide endblocked polyester resin was prepared by heating 200 grams of polyester resin flakes in a three-neck reaction flask in 425 ml of toluene with stirring under a nitrogen atmosphere. The solution was maintained at reflux for about an hour until all water had azeotroped into a Dean-Stark trap. After readjusting the solution temperature to 100° C., a slight stoichiometric excess of the corresponding isocyanate (n-butyl, p-chlorophenyl, phenyl, p-nitrophenyl or 2,5-dichlorophenyl) in 25 ml of toluene was added to the reaction flask, and an initial infrared scan of the reaction solution was recorded. Five ml of a urethane catalyst comprising dibutyltin dilaurate in toluene (0.20 gram per 10 ml of toluene) were then added, and the flask maintained at 100° C. with stirring until the infra-red scans indicated that either no isocyanate remained or that the reaction had gone to completion as evidenced by no further consumption of isocyanate. Residual isocyanate was next scavenged from the reaction mixture by adding 0.5 ml of 1-propanol to the solution at room temperature. The solids content of the solution was then adjusted to about 27 weight percent by adding 188.3 grams of methyl ethyl ketone.

A photoconductive coating solution was thereafter prepared from the solution of urethane/amide endblocked polyester (preferably the $p\text{-}ClC_6H_4NCO$ endblocked polyester) by the addition of the photoconductor and the ethyl violet sensitizer. This coating solution was then solution coated upon the 5 ml polyester support conductivized with semi-transparent aluminum.

The pre-exposure fatigue properties of the resulting electrophotographic films were then measured by determining the time of exposure to 50 foot-candles of cool white fluorescent light required to deteriorate the film's photospeed to 50% of its initial value ($t_{\frac{1}{2}}$ value). The speed measurements were made after a 24 hour dark adaptation recovery period to insure that permanent rather than transient changes were being measured. The results of these experiments are set forth in Table I with the above defined $t_{\frac{1}{2}}$ values normalized to the value of the phenylenediamine - vinyl/acrylic sample to reveal the very significant improvements obtained.

TABLE I

| Photoconductor (25% Loading) | Binder Resin | |
|---|---|---|
| | Vinyl/Acrylic | Polyester |
| Tetrakisalkarylphenylenediamine | 1.0 | 3.6 |
| 4,4'-bis(diethylamino)-2,2'-dimethyl-4''-carbomethoxy-triphenylmethane | 1.5 | 7.2 |

As can be seen from the data set forth in Table I, 4,4'-bis(diethylamino)-2,2'-dimethyl-4''-carbomethoxy-triphenylmethane, a photoconductor in accordance with the present invention, possesses a significantly improved pre-exposure fatigue resistance as compared with tetrakisalkarylphenylenediamine, a representative prior art organic photoconductor which has found widespread commercial use.

EXAMPLE III

A series of electrophotographic films was prepared in order to demonstrate the enhanced blooming properties of the organic photoconductor compounds of the present invention at various photoconductor loadings. Each of the electrophotographic films tested comprised an organic photoconductor (in loadings of 25% by weight, 35% by weight or 45% by weight of the resin matrix), together with 0.03% by weight of ethyl violet sensitizer dye, dispersed in the polyester resin binder described in Example II. The support material in each of these films comprised the aluminumized polyester support also described in Example II. The organic photoconductors employed in each of the various samples included 4,4'-bis(diethylamino)-2,2'-dimethyl-4''-carbomethoxytriphenylmethane, the diester of Example IB, both of which comprise organic photoconductors in accordance with the present invention, the 4,4'-bis(diethylamino)-2,2'-dimethyltriphenylmethane of U.S. Pat. No. 4,047,949 and tetrakisalkarylphenylenediamine.

The blooming properties of each of the foregoing photoconductors were tested by storing the sample films for four months at room temperature (20° C.), and then examining the film surfaces for evidence of photoconductor migration, which manifested itself in the form of liquid or crystalline surface deposits when present, depending upon the nature of the migrating organic photoconductor. The results of these experiments are set forth in Table II.

TABLE II

COMPARATIVE BLOOMING PROPERTIES OF PHOTOCONDUCTOR STRUCTURES

| Photoconductor | Wt. % in Matrix Resin | | |
|---|---|---|---|
| | 25% | 35% | 45% |
| 4,4'-bis(diethylamino)-2,2'-dimethyl-4''-carbomethoxy-triphenylmethane | No | Trace | Definite |
| 4,4'-bis(diethylamino)-2,2'-dimethyltriphenylmethane | No | Definite | Heavy |
| Diester of Example IB | No | No | Definite |
| Tetrakisalkarylphenylene-diamine | No | Definite | Heavy |

As can be seen from Table II, the organic photoconductors of the present invention exhibit improved blooming properties as compared with tetrakisalkarylphenylenediamine and 4,4'-bis(diethylamino)-2,2'-dimethyltriphenylmethane. This difference in blooming properties was particularly noticeable at photoconductor loadings of 35% by weight, wherein the organic photoconductors of the present invention exhibited little or no blooming, whereas the organic photoconductors of the prior art exhibited a pronounced tendency to bloom.

While the invention has now been described in terms of certain preferred embodiments, and illustrated by numerous examples, the skilled artisan will readily appreciate that various modifications, changes, substitutions, and omissions may be made without departing from the spirit thereof. Accordingly, it is intended that the scope of the present invention be defined solely by the scope of the following claims.

What is claimed is:

1. A compound of the formula

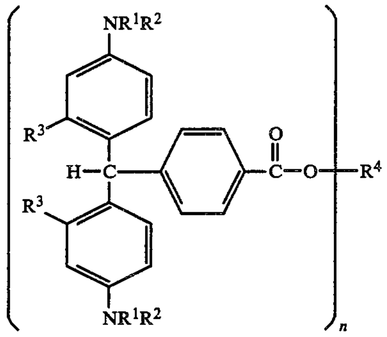

(I)

wherein n is the integer 1 or 2; $R^1$ and $R^2$ are each an alkyl or aralkyl radical; $R^3$ is an alkyl radical; when n is 1, $R^4$ is an alkyl, aralkyl, alkenyl or aralkenyl radical, or an aryl radical having 6 carbon atoms in the aromatic nucleus, or a polyether radical containing up to 10 ether groups; and when n is 2, $R^4$ is a divalent linking radical selected from the group consisting of alkylene, aralkylene, alkenylene and aralkenylene radicals, arylene radicals having 6 carbon atoms in the aromatic nucleus and divalent polyether radicals containing up to 10 ether units.

2. A compound as claimed in claim 1, wherein $R^1$ and $R^2$ are each an alkyl radical containing up to 5 carbon atoms or an aralkyl radical containing up to 14 carbon atoms; $R^3$ is an alkyl radical containing up to 5 carbon atoms; when n is 1, $R^4$ is an alkyl radical containing up to 18 carbon atoms, an aralkyl radical containing up to 14 carbon atoms, an alkenyl radical containing up to 10 carbon atoms, an aralkenyl radical containing up to 14 carbon atoms, a phenyl radical, a lower alkyl-substituted phenyl radical or a polyether radical containing up to 10 ether units; and when n is 2, $R^4$ is an alkylene radical containing up to 10 carbon atoms, an aralkylene radical containing up to 14 carbon atoms, an alkenylene radical containing up to 10 carbon atoms, an aralkenylene radical containing up to 14 carbon atoms, a phenylene radical, a lower alkyl-substituted phenylene radical or a divalent polyether radical containing up to 10 ether units.

3. A compound as claimed in claim 1, wherein $R^1$ and $R^2$ are each methyl, ethyl, propyl or isopropyl; $R^3$ is methyl or ethyl; and $R^4$ is an alkyl group containing up to 18 carbon atoms, an alkenyl group containing up to 10 carbon atoms, an alkylene radical containing up to 10 carbon atoms, phenyl, lower alkyl-substituted phenyl, benzyl, lower alkyl-substituted benzyl, alpha-phenethyl, beta-phenethyl, alpha-phenylpropyl, beta-phenylpropyl, phenylene or lower-alkyl substituted phenylene, or a monovalent or divalent polyethylene glycol, polypropylene glycol or polybutylene glycol group containing up to 10 glycol units.

4. A compound as claimed in claim 1, wherein $R^1$ and $R^2$ are each methyl, ethyl, propyl or isopropyl; $R^3$ is methyl or ethyl; and $R^4$ is methyl, ethyl, isopropyl or butyl.

5. A compound as claimed in claim 1, wherein $R^1$ and $R^2$ are each methyl, ethyl, propyl or isopropyl; $R^3$ is methyl or ethyl; and $R^4$ is a benzyl or phenylene radical substituted with hydroxy, halo, nitro, cyano, sulfo, lower alkoxy, carboxy, lower acyl, lower acylamido or lower acyloxy.

6. A compound as claimed in claim 1, wherein $R^1$ and $R^2$ are each ethyl and $R^3$ is methyl.

7. A compound as claimed in claim 6, wherein n is 1 and $R^4$ is an alkyl radical containing up to 18 carbon atoms.

8. A compound as claimed in claim 6, wherein n is 2 and $R^4$ is an alkylene radical containing up to 10 carbon atoms.

9. The compound as claimed in claim 1, which is 4,4'-bis(diethylamino)-2,2'-dimethyl-4"-carbomethoxy-triphenylmethane.

10. The compound as claimed in claim 1, which is 4,4'-bis(diethylamino)-2,2'-dimethyl-4"-carbodecyloxy-triphenylmethane.

11. The compound as claimed in claim 1, having the formula

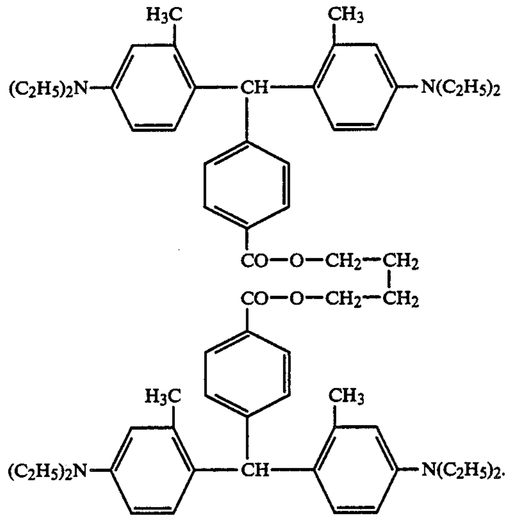

12. The compound of claim 1, wherein n is 1 and $R^4$ is a polyether radical containing up to 10 ether groups.

13. The compound of claim 1, wherein n is 2 and $R^4$ is a divalent polyether radical containing up to 10 ether units.

* * * * *